(No Model.)
C. C. GARTLAND.
ELECTRIC REGULATOR.
No. 584,155.
2 Sheets—Sheet 1.
Patented June 8, 1897.
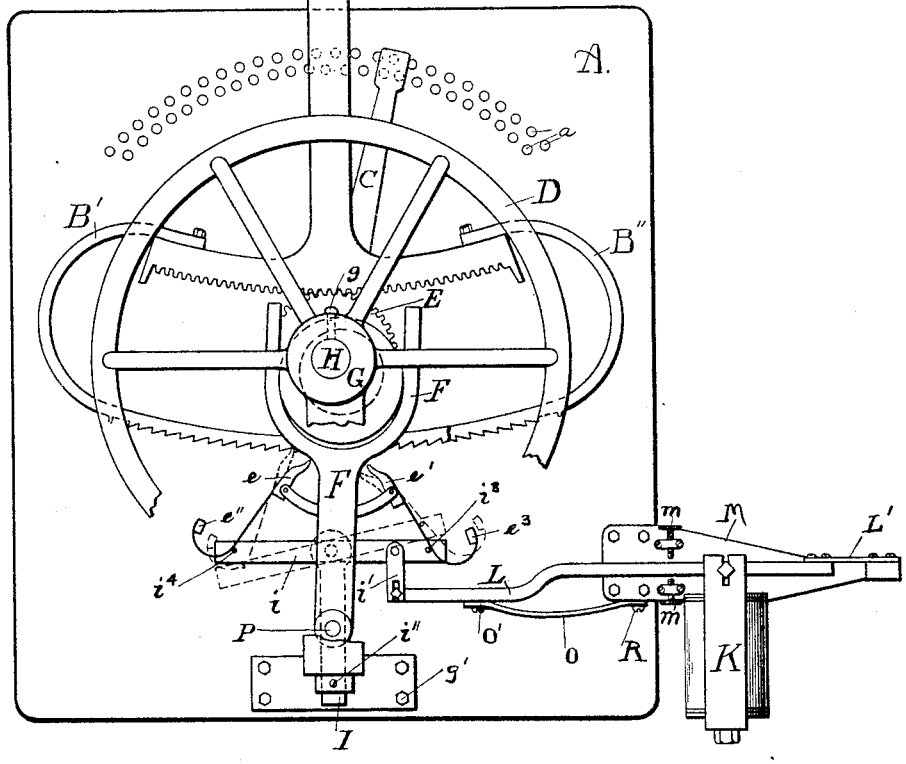
Fig. 1.
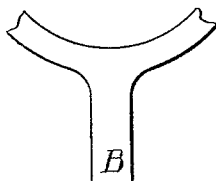
Fig. 3.
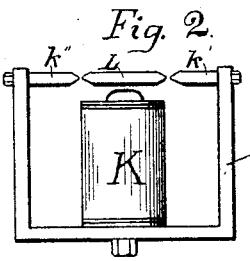
Fig. 2.
Fig. 5.
WITNESSES
H. E. Kritch
H. B. Cavanaugh
INVENTOR
C. C. Gartland
by
Attorney.

(No Model.) 2 Sheets—Sheet 2.
C. C. GARTLAND.
ELECTRIC REGULATOR.
No. 584,155. Patented June 8, 1897.
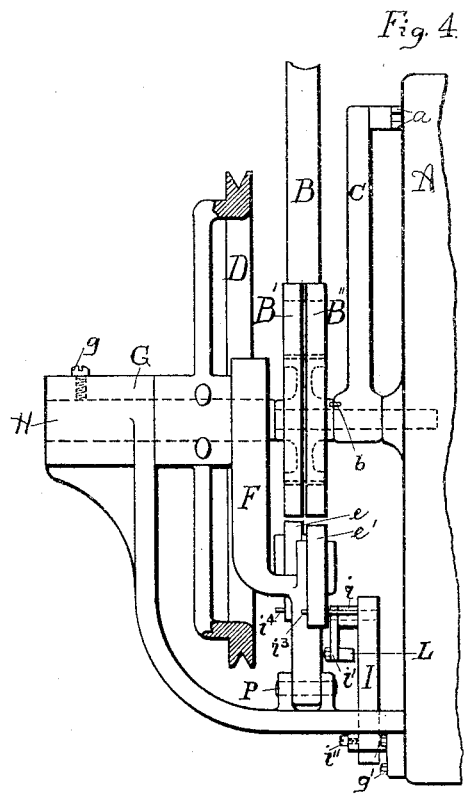
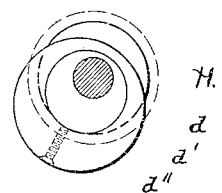
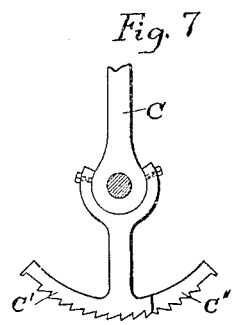
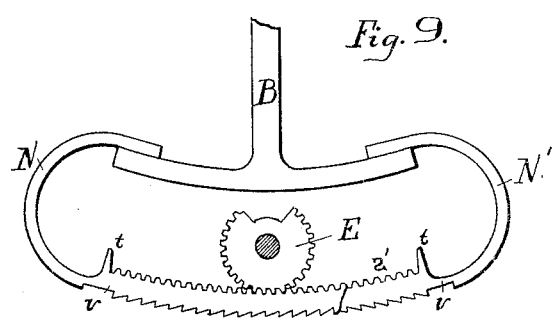
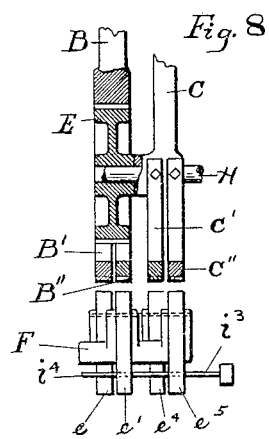
WITNESSES
W. E. Kritch
H. B. Cavanaugh
INVENTOR
C. C. Gartland
by C. M. Vorce
Attorney.

UNITED STATES PATENT OFFICE.

CHRISTOPHER C. GARTLAND, OF BUFFALO, NEW YORK.

ELECTRIC REGULATOR.

SPECIFICATION forming part of Letters Patent No. 584,155, dated June 8, 1897.

Application filed September 4, 1896. Serial No. 604,861. (No model.)

*To all whom it may concern:*

Be it known that I, CHRISTOPHER C. GARTLAND, a citizen of the United States, residing at Buffalo, in the county of Erie and State of New York, have invented certain new and useful Improvements in Electric Regulators; and I do hereby declare the following to be a full, clear, and exact description of the invention, such as will enable others skilled in the art to which it appertains to make and use the same.

My invention relates to improvements in electric regulating devices.

The object of the invention is to improve the efficiency of such apparatus, to render it automatic and certain in operation, more than usually sensitive, and incapable of disarrangement after being once adjusted, while at the same time simple and economical in construction; and it consists in the novel features of construction, arrangement, and combination hereinafter described, and pointed out in the claims.

The specific purpose for which this device has been designed is the regulation of dynamo-electric machines for the purpose of keeping either the electromotive force or the quantity of the current furnished by such machines at a predetermined point; but it is capable of being applied as a governor to keep the speed of any machine at a predetermined point.

In the drawings the device is shown as applied to dynamo regulation.

Figure 1 is a front view in elevation of the complete device. Figs. 2 and 3 are respectively a side elevation and a plan view of the electromagnet by which the device is actuated. Fig. 4 is a side elevation of the device broken away in part. Fig. 5 is a detail of the magnet and armature. Fig. 6 is a detail of the eccentric; and Figs. 7, 8, and 9 are detail views of specific parts, showing modified or alternative features of construction.

Premising that the general principle of the device is the regulation of the dynamo by varying the excitation of its field, the apparatus is described as follows:

A represents the casing of a rheostat, and $a$ the contact studs or buttons between which the resistance-coils are interposed. This rheostat may be of any usual or preferred construction, and I prefer to connect it in parallel with the field of the dynamo, although it may be otherwise connected.

B represents an arm extending from the rocker of the armature-brushes; C, a contact-arm engaging the contact-buttons $a$ and pivoted on a pin or short rod H.

The regulation of the dynamo is effected by the movement of the arms B and C in the following manner: As the current in the dynamo increases or decreases beyond the limit which it is desired to maintain more or less resistance through the rheostat is interposed by the movement of arm C and the armature-brushes are simultaneously rocked by the arm B, these movements being effected by means of oppositely-acting pawls which can engage racks or gear moving the arms B and C, but are normally maintained out of engagement therewith. These pawls are acted upon by an electro magnet or magnets energized by current from the dynamo to be regulated and one or the other made to act on the arms B and C as the current of the machine increases or decreases, it being impossible for both pawls to engage at the same time. To effect such action of the pawls, they are supported in the proper position on a constantly-oscillating arm, which, when either pawl is caused by the magnet to engage the rack, rapidly moves the latter in the proper direction. The oscillation of the pawl-carrying arm may be effected in any suitable manner, that which I prefer being shown in Figs. 1 and 4. A continuously-driven pulley D rotates an eccentric $d$, which is is preferably surrounded by a second eccentric $d'$, which can be rotated on $d$ and secured rigidly thereto, as by the screw $d''$. (See Fig. 6.) Spanning the eccentrics $d\ d'$ is a forked or U-shaped arm F, pivoted at P and carrying the oppositely-acting pawls $e$ and $e'$, from each of which depends a weighted arm or spring tending, when unsupported, to drop by gravity and bring the pawl into engagement with a ratchet rigid with the brush-rocker arm B. The two ratchets B' B'' are secured to the arm B side by side and are set with the teeth of their ratchets oppositely disposed, each ratchet being engaged by one of the pawls. As the arm B is moved in one direction the brushes are rocked in the opposite direction. E is a gear mounted on the rod H and preferably secured rigidly to the hub of arm C, as by the pin $b$, and engaging a rack $s$ on the arm B, as hereinafter described. A rocking lever $i$ is supported below the pawls $e$ $e'$ and engaging their depending springs by pins $i^3$ $i^4$. The lever $i$ is connected, as by link $i'$, to the free end of a vibrating armature L, suspended by its other end from a spring L', which tends to lift it above the poles $k'$ $k''$ of the electromagnet K, to a prolongation $k$ of whose core the poles $k'$ $k''$ are adjustably secured. Inasmuch as the magnet K is always energized when the dynamo is running, the armature is rendered more adjustably sensitive and its action brought under complete control by the following construction: A spring O is secured to the projecting lever end of the armature, as at O', and is adjustably secured, as by screw R, to a rigid support, such as the bracket-arm M, which supports the spool K and the armature L. By this means the armature is accurately balanced, and the amount of energy in the spool which is required to depress it can be accurately gaged by the adjustment of spring O. To limit the play of the armature, adjustable stops $m$ $m$ are arranged above and below it, so that its play is just sufficient to certainly effect the engagement of one or the other of the pawls when at its limit of movement.

In describing the operation of the device it may be assumed, for illustration, that it is applied to effect the regulation of the current of a dynamo capable of generating six thousand volts and that it is desired to maintain in the working circuit a constant current of ten amperes. The spool K is wound to have a power just sufficient to hold the armature balanced in line with the poles $k'$ $k''$ when ten amperes is maintained in the dynamo, acting, of course, against the springs L' and O. In this condition the armature L is maintained midway between the stops $m$ $m$, and the lever $i$ is maintained in a position which supports both of the pawls $e$ $e'$ out of engagement with the ratchets B' B'', and the whole is in a state of equilibrium. If now the current of the dynamo decreases, from increase of the load on the working circuit or other cause, the decreased power of the spool K will allow the armature L to be lifted by the springs L' and O, and this will rock the lever $i$ and allow the pawl $e$ to engage the ratchet B', as shown in dotted lines in Fig. 1. The constantly-oscillating arm F will then cause the pawl to move the ratchet B' toward the right-hand side of the figure and slightly move the brush-rocker the opposite way, at the same time rotating the gear E, which meshes with the rack on the arm B, and this will move the rheostat-arm C, to which the gear E is secured, toward the right, so as to progressively increase the resistance of the rheostat, thereby throwing more current through the field of the dynamo and consequently increasing its current until the desired current is restored, when the increased power of spool K will draw down the armature, disengage the pawl $e$, and restore the condition of equilibrium in the apparatus. If the increase of current in the machine continues, the spool will depress the armature L below its normal position and cause the other pawl $e'$ to engage the ratchet B'', moving the rheostat-arm in the reverse direction, cutting out resistance in the rheostat, and thus weakening the field of the machine, which will at once decrease the current of the machine to the predetermined limit. In this manner a perfect automatic regulation of the dynamo is obtained and the current maintained at the limit set, but with infinitesimal fluctuations.

The application of the device to the regulation of constant potential is in the same manner, the spool K being wound according to the electromotive force required. It may also be applied to the regulation of alternating-current machines, as well as to separately-excited machines generally, by connecting the rheostat in series with the field-coils of the exciting-machine, and in the case of the alternating-machine preferably connecting the spool K in the secondary circuit from a transformer, in which circuit a second rheostat, operated by a spool in the primary circuit of the alternator, is also interposed, said second resistance being so arranged as to give to spool K the same amount of current, and hence of strength, with one hundred and ten volts potential around it at one hundred volts, thus automatically taking care of the line-loss on primary circuit in exact proportion to the loss at any and all variations of load. When used to regulate the speed of machinery, the arm B is connected to any suitable speed-governor and electric current is supplied to the spool K from any convenient source.

The poles $k'$ $k''$ are preferably formed with acute terminals, as seen in Fig. 2, and are adjustable on the core-piece $k$ by seating their clamping-screws in slots in the core-piece, as seen in Fig. 1. The armature L is also sharp-edged opposite the poles $k'$ $k''$, Fig. 2, whereby the action of the magnet K is rendered more sensitive by the action of the opposite points or edges. Instead of a single point the edges of the poles and armature may be formed with two or more points, if preferred.

There are certain obvious modifications of structure which may be introduced into the device without varying the essential mode of operation above described or departing from my invention. Thus instead of connecting the gear E to arm C and operating both by the single pair of pawls $e$ $e'$, the arm C may be independent of gear E and be provided with the oppositely-disposed ratchets $c'$ $c''$, and a second pair of pawls $e^4$ $e^5$ may be carried by the arm F and made to actuate the arm C, as shown in Fig. 8, the pins $i^3$ $i^4$ being lengthened to support both sets of pawls. It is obvious also that the pawls $e^4$ $e^5$ could be operated independently by simply duplicating the spool K and causing its armature to operate them in the same manner as pawls e e'; also the lever i could be itself the armature of the spool K, and the pawls could be kept normally out of engagement with their racks by gravity and made to engage therewith by the positive action of the magnet, but these modifications of structure are mere mechanical equivalents for the preferred construction shown.

The extent to which the arms B and C can be moved by the pawls is limited by the length of the ratchets, the pawls moving in the smooth untoothed space v at the ends of the ratchets without moving the same, and to permit the arm B after moving a certain distance to be further moved without actuating the arm C a portion of the toothed periphery of the gear E is cut away, as seen in Fig. 9, and the rack on B ends in a lug or projecting tooth t, which plays in the recessed space, and when the motion of B is reversed brings the gear E again into engagement with the rack. Fig. 9 also shows a modification of construction in which the rack on arm B is replaced by a rack cut on the back of the ratchets, and the action of the gear E is to move the arm C in the same direction as that in which arm B moves, while the construction shown in Fig. 1 moves the arms B and C in opposite directions.

The pawls are preferably pivoted on an arm F', rigid with the constantly-rocking arm F, and the lever i is pivoted on a standard or support, I vertically adjustable, as by the screw i'', whereby the amount of movement given to the pawls by the lever i is capable of exact adjustment. By the adjustment of the eccentrics d d' any desired amount of throw can be given to the oscillating arm F, and in connection with the adjustability of lever i enables the operation and effect of the pawls to be adjusted with the utmost delicacy and accuracy. When once adjusted, the operation of the device is positive and certain, always uniform, and unless broken it cannot get out of adjustment. As shown, the arm F is pivoted on a bracket G, which also carries one end of the pin or rod H, which is secured to it by screw g, while the bracket is secured to the rheostat-case by screw g', but it is obvious that the rod H could be made rigid with the rheostat-case or other supporting-base and the bracket G dispensed with, if desired.

Having fully described my invention, what I claim as novel, and desire to secure by Letters Patent, is—

1. In an electric regulator for dynamo-electric machines the combination of a rheostat, a connecting-arm arranged to vary the resistance thereof, an arm connected to the brush-rocker of the dynamo, ratchets actuating said arms, oppositely-acting pawls adapted to engage said ratchets and move the same in either direction, a rocking lever engaging said pawls and adapted to move the same in or out of engagement with said ratchet, and an electromagnet having its armature connected to one arm of said lever, substantially as described.

2. The combination of the rheostat, an arm adapted to vary the resistance thereof, a gear actuating said arm, an arm connected to the brush-rocker and having a rack engaging said gear on the rheostat-arm, a ratchet actuating said brush-rocker arm, oppositely-acting pawls adapted to engage said ratchet and move the same in either direction, a rocking lever engaging said pawls and adapted to move the same in or out of engagement with said ratchet, and an electromagnet having its armature connected to one arm of said lever, substantially as described.

3. The combination of the rheostat, an arm adapted to vary the resistance thereof, a gear actuating said arm, an arm connecting to the brush-rocker and having a rack engaging said gear on the rheostat-arm, a ratchet actuating said brush-rocker arm, an oscillating arm carrying oppositely-acting pawls adapted to engage said ratchet and move the same in either direction, a rocking lever engaging said pawls and adapted to move the same in or out of engagement with said ratchet, and an electromagnet having its armature connected to one arm of said lever, substantially as described.

4. The combination of the rheostat, an arm adapted to vary the resistance thereof, a gear actuating said arm, an arm connected to the brush-rocker and having a rack engaging said gear on the rheostat-arm, a ratchet actuating said brush-rocking arm, a driven pulley having an eccentric on its hub, a forked arm spanning said eccentric and carrying oppositely-acting pawls adapted to engage said ratchet and move the same in either direction, a rocking lever engaging said pawls and adapted to move the same in or out of engagement with said ratchet, and an electromagnet having its armature connected to one arm of said lever, substantially as described.

5. In an electric regulator the combination with the rheostat-arm and gear rigid therewith, the brush-rocker arm having a rack meshing with said gear, and the oppositely-disposed ratchets rigid with said brush-rocker arm, of the oppositely-acting pawls, an oscillating lever each end of which engages one of said pawls, and an electromagnet whose armature is connected to one arm of said lever, substantially as described.

6. The combination with the brush-rocker arm and the toothed segment thereon, and the ratchets and oppositely-acting pawls for moving said arm, of the recessed gear rigid with the rheostat-arm and engaging said segment, and a lug or projection on the segment adapted to engage the recess in the gear, substantially as described.

7. The combination with the rheostat-arm, the ratchets operating the same, the oppositely-disposed pawls pivoted on an oscillating arm, and an electromagnet adapted to effect the engagement of said pawls with said ratchets, of the driven pulley, an eccentric rigid therewith, and a second eccentric adjustable about the first and engaging said oscillating arm, substantially as described.

8. The combination with the electromagnetic bobbin having pointed or notched poles, of the armature suspended between said poles and correspondingly pointed or notched, substantially as described.

9. The combination with the electromagnetic bobbin having pointed or notched adjustable poles, of the armature suspended between said poles and correspondingly pointed or notched, substantially as described.

10. The combination with the electromagnetic bobbin having its core prolonged by the U-shaped pole-piece $k$ and with the pointed or notched poles $k'$ $k''$ adjustably secured thereto, of the correspondingly notched or pointed armature flexibly suspended between the poles $k'$ $k''$, substantially as described.

11. The combination with the rocking pawl-actuating lever, of the electromagnet having its armature flexibly supported at one end and adjustably connected at the other end to the rocking lever, substantially as described.

12. The combination of the rheostat-arm having a gear rigid therewith, the brush-rocker arm having a rack engaging said gear and a ratchet on the opposite side of said gear, oppositely-disposed pawls adapted to engage said ratchet and move the same in either direction, a lever engaging said pawls and adapted to effect their engagement with said ratchet, and an electromagnet having its armature connected to said lever, substantially as described.

In testimony whereof I hereto affix my signature in presence of two witnesses.

CHRISTOPHER C. GARTLAND.

Witnesses:
REGINALD F. PENTON,
WALTER F. HOFHEINS.